United States Patent [19]

Nakayama et al.

[11] Patent Number: 5,160,572
[45] Date of Patent: Nov. 3, 1992

[54] OPTICAL MEMORY DEVICE AND APPARATUS FOR MANUFACTURING THE SAME

[75] Inventors: Junichiro Nakayama, Nara; Kazuhiro Kimura, Nishinomiya; Hiroyuki Katayama; Kenji Ohta, both of Nara, all of Japan

[73] Assignee: Sharp Kabushiki Kaisha, Osaka, Japan

[21] Appl. No.: 734,919

[22] Filed: Jul. 24, 1991

Related U.S. Application Data

[62] Division of Ser. No. 374,071, Jun. 30, 1989.

[30] Foreign Application Priority Data

Jul. 8, 1988 [JP] Japan .............................. 63-171310
Jul. 8, 1988 [JP] Japan .............................. 63-171311

[51] Int. Cl.[5] ............................................ B32B 33/00
[52] U.S. Cl. ................................ 156/510; 156/253; 156/277; 156/324; 156/496; 204/298.11; 204/298.24; 358/348; 365/110; 365/113; 365/127; 369/125; 369/275.1; 430/19
[58] Field of Search ............... 156/510, 253, 277, 324, 156/495, 496; 369/125, 275.1; 358/348; 430/19; 365/127, 113, 110; 204/298.11, 298.24

[56] References Cited

U.S. PATENT DOCUMENTS

| | | | |
|---|---|---|---|
| 3,801,824 | 4/1974 | Eastwood et al. | 365/127 |
| 4,303,489 | 12/1981 | Morrison, Jr. | 204/298.11 |
| 4,778,747 | 10/1988 | Ohta et al. | 430/394 |
| 5,038,321 | 8/1991 | Van Zeghbroeck | 365/110 |

*Primary Examiner*—David A. Simmons
*Assistant Examiner*—Merrick Dixon
*Attorney, Agent, or Firm*—Cohen, Pontani, Lieberman & Pavane

[57] ABSTRACT

An apparatus for manufacturing an optical memory device, which includes supplying rolls for continuously supplying a sheet-like substrate, a masking endless belt having a plurality of windows of size corresponding to the optical memory device, rolls for moving the sheet-like substrate and the masking endless belt in the same direction and at the same speed, a recording portion forming device for forming recording portions on the substrate through the masking endless belt, a guide track providing device for providing along the substrate guide tracks for guiding a light beam, and a cutting device for cutting the substrate to a predetermined size.

2 Claims, 3 Drawing Sheets

OPTICAL MEMORY DEVICE AND APPARATUS FOR MANUFACTURING THE SAME

This is a division of application Ser. No. 07/374,071, filed on Jun. 30, 1989.

BACKGROUND OF THE INVENTION

1. Field of the Invention

The present invention relates to optical memory devices capable of optically recording, reading and erasing information and an apparatus for manufacturing the same.

2. Description of the Prior Art

An optical memory device comprises a substrate, a recording layer formed on the substrate, and a protective layer formed on the recording layer for protecting the same (see U.S. Pat. No. 4,544,835 and No. 4,680,460).

A conventional optical memory device manufacturing apparatus is constructed to carry by a belt a substrate previously cut in a constant shape and to form a recording layer by sputtering or evaporating the substrate from below a mask of almost the same size as that of the substrate provided below the substrate in a recording layer forming portion. In addition, it is constructed to form guide trucks on the substrate having the recording layer formed thereon and cut the substrate in a predetermined shape simultaneously by a press cutter.

However, when in such a conventional manufacturing apparatus, a sheet-like substrate is wound like a roll to attempt to continuously form a recording layer on this sheet-like substrate while continuously feeding the substrate, it is impossible to continuously mask the sheet-like substrate continuously fed using the above described mask. Thus, when such a mask is used, a substrate previously cut in a constant shape must be used as the substrate. Accordingly, in practice, production efficiency can not be satisfactorily improved.

SUMMARY OF THE INVENTION

The present invention provides an optical memory device manufacturing apparatus which comprises supplying means for continuously supplying a sheet-like substrate, endless belt-like masking means having a plurality of windows of size corresponding to the optical memory device, moving means for moving the sheet-like substrate and the endless belt-like masking means in the same direction and at the same speed, recording portion forming means for forming recording portions on the substrate through the endless belt-like masking means, guide truck providing means for providing along the substrate guide trucks for guiding a light beam, and cutting means for cutting the substrate to a predetermined size.

The manufacturing apparatus according to the present invention makes it possible to form the recording portions while continuously masking the sheet-like substrate. Thus, optical memory devices can be continuously manufactured. Accordingly, the cost of optical memory devices can be reduced and optical memory devices of constant quality can be stably supplied.

DESCRIPTION OF THE PREFERRED EMBODIMENTS

Figure 1:
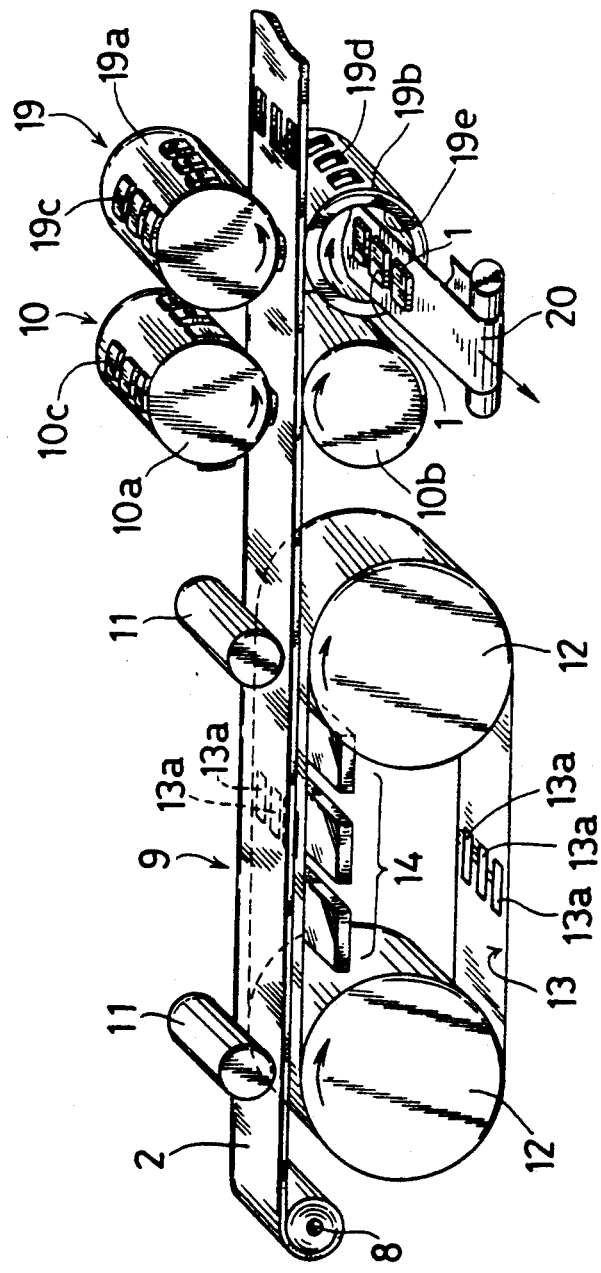
FIG. 1 is a diagram showing a schematic structure of an optical memory device manufacturing apparatus according to an embodiment of the present invention.

An optical memory device manufacturing apparatus according to the present invention comprises supplying means for continuously supplying a sheet-like substrate, endless belt-like masking means having a plurality of windows of size corresponding to the optical memory device, moving means for moving the sheet-like substrate and the masking means in the same direction and at the same speed, recording portion forming means for forming recording portions on the substrate through the masking means, guide truck providing means for providing along the substrate guide trucks for guiding a light beam, and cutting means for cutting the substrate to a predetermined size. A film made of resins having light permeability, such as a film made of polycarbonate resins approximately 0.2 to 1.0 mm thick, is used as the above described sheet-like substrate.

The above described supplying means is preferably a roll around which a sheet-like substrate having a predetermined width is wound but is given not by way of limitation.

The above described masking means is, for example, an endless belt having a plurality of windows for masking at predetermined spacing in crosswise and lengthwise directions.

The above described moving means may be any apparatus for opposing a flat portion of the masking means to the sheet-like substrate supplied from the supplying means to move the substrate and the masking means in the same direction and at the same speed. The moving means comprises, for example, a pair of stretching rollers for stretching the endless belt-like masking means, a plurality of pressure rollers for pressing the sheet-like substrate against the masking means on the stretching rollers, and a drive for rotating the stretching rollers and the pressure rollers.

An apparatus for forming a recording portion utilizing a sputtering process, a vacuum evaporation process or a spray process which are known in the art is used as the above described recording portion forming means. An RE-TM magnetic thin film with perpendicular magnetization containing TaFeCo, GdTbFe, NdDyFeCo, TbFe or GdTbFeCo, a garnet magnetic thin film containing Co substitution garnet and Bi substitution rare earth-iron garnet, or a polycrystal perpendicular magnetic thin film containing PtMnSb or MnBi is used as the recording portion formed by the sputtering process and the vacuum evaporation process. On the other hand, the recording portion formed by the spray process is made of photochromic materials, organic dyestuff materials or the like.

The above described guide truck providing means may be one comprising a driving roller having irregular portions for guide tracks on its cylindrical surface and a pressure roller for pressing a sheet-like substrate on the driving roller and for continuously forming guide trucks on the substrate by transcribing patterns of the irregular portions to the substrate.

Furthermore, the above described guide truck providing means may comprise supplying means for supplying a substrate for forming guide trucks, transcribing means for transcribing patterns corresponding to guide trucks to the guide track forming substrate, and laminating means for continuously laminating the guide track forming substrate having the guide tracks transcribed thereto to the above described sheet-like substrate having the recording portions formed thereon with an adhesive having light permeability. In addition, the guide truck providing means may be one for forming the guide trucks by printing.

The above described cutting means preferably comprises, for example, a cutting roller having cutting edge portions corresponding to the size of the optical memory device on its cylindrical surface and a cylindrical roller having holes corresponding to the cutting edge portions on its cylindrical surface and is adapted to punch the optical memory device with the sheet-like substrate being interposed between the cutting roller and the cylindrical roller but is given not by way of limitation.

An embodiment of the manufacturing apparatus according to the present invention will be described with reference to FIG. 1.

A sheet-like substrate 2 is formed of polycarbonate resins having light permeability, the thickness thereof being set to approximately 0.2 to 1.0 mm. The sheet-like substrate 2 is wound around sheet supplying means 8 like a roll and adapted to be continuously supplied to a recording portion forming station 9 from the side of one end thereof.

The recording portion forming station 9 is arranged in a predetermined atmosphere, for example, in an atmosphere of argon gas and adapted to continuously form recording portions on the surface of the sheet-like substrate 2 by a sputtering process. More specifically, the recording portion forming station 9 comprises a mask 13 like an endless belt having transmitting window portions 13a formed there on according to a constant pattern and a sputtering device comprising a target, a heater, an electrode, a magnet and the like which are arranged below the mask 13. In addition, the mask 13 is stretched between two rotary rollers 12. The mask 13, along with the sheet-like substrate 2, is adapted to be interposed between rollers 11 and the rollers 12. In a flat portion formed between the rollers 12, the mask 13 is adapted to move at the same speed as that of the sheet-like substrate 2 while facing the sheet-like substrate 2. Of course, the above described transmitting window portions 13a having a constant pattern repeatedly face the sheet-like substrate 2 because the mask 13 is formed like an endless belt. Meanwhile, the rollers 11 and 12 are driven by not-shown driving means.

A guide track forming station 10 is disposed on the downstream side of the recording portion forming station 9. This guide track forming station 10 comprises a pair of rollers 10a and 10b arranged opposed to each other with the sheet-like substrate 2 being interposed therebetween and both rotatably provided and is adapted to continuously form guide trucks by feeding the sheet-like substrate 2 fed through the recording portion forming station 9 while applying pressure thereto to transcribe patterns of irregular portions 10c formed on the cylindrical surface of one of the rollers 10a to the sheet-like substrate 2.

A cutting processing station 19 for cutting the sheet-like substrate 2 in a constant shape is disposed on the downstream side of the guide truck forming station 10. The cutting processing station 19 comprises a pair of rollers 19a and 19b arranged opposed to each other with the sheet-like substrate 2 being interposed therebetween and both rotatably provided in the forward direction and is adapted to feed the sheet-like substrate 2 while applying pressure thereto and cut by punching optical memory devices 1 having a shape corresponding to the shape of cutting edge portions 19c formed on the cylindrical surface of one of the rollers 19a to sequentially drop the optical memory devices 1 cut by punching from hole portions 19d, corresponding to the cutting edge portions 19c, on the other roller 19b.

Additionally, a carrying belt 20 is travelably provided in a cavity portion 19e formed in the other roller 19b. The above described optical memory devices 1 cut by punching are dropped on this carrying belt 20 to be mounted thereon and then, sequentially carried to a not-shown coating processing station by the carrying belt 20.

The rotational speed of each of the rollers 11, 12, 10a, 10b, 19a and 19b is controlled such that the sheet-like substrate 2 is fed at constant speed. The thickness of the recording portion formed by the sputtering process in the recording portion forming station 9 can be controlled by electric power supplied for sputtering, the gas pressure of atmospheric gas (argon), the size of a target for sputtering, and the like.

Furthermore, although description was made of a case in which the recording portion forming station 9 is provided on the upstream side of the guide track forming station 10, the positions of the recording portion forming station 9 and the guide truck forming station 10 may be replaced with each other. In addition, although coating processing is performed after cutting the optical memory devices 1 by punching, coating processing may be performed in the step before punching.

Figure 2:
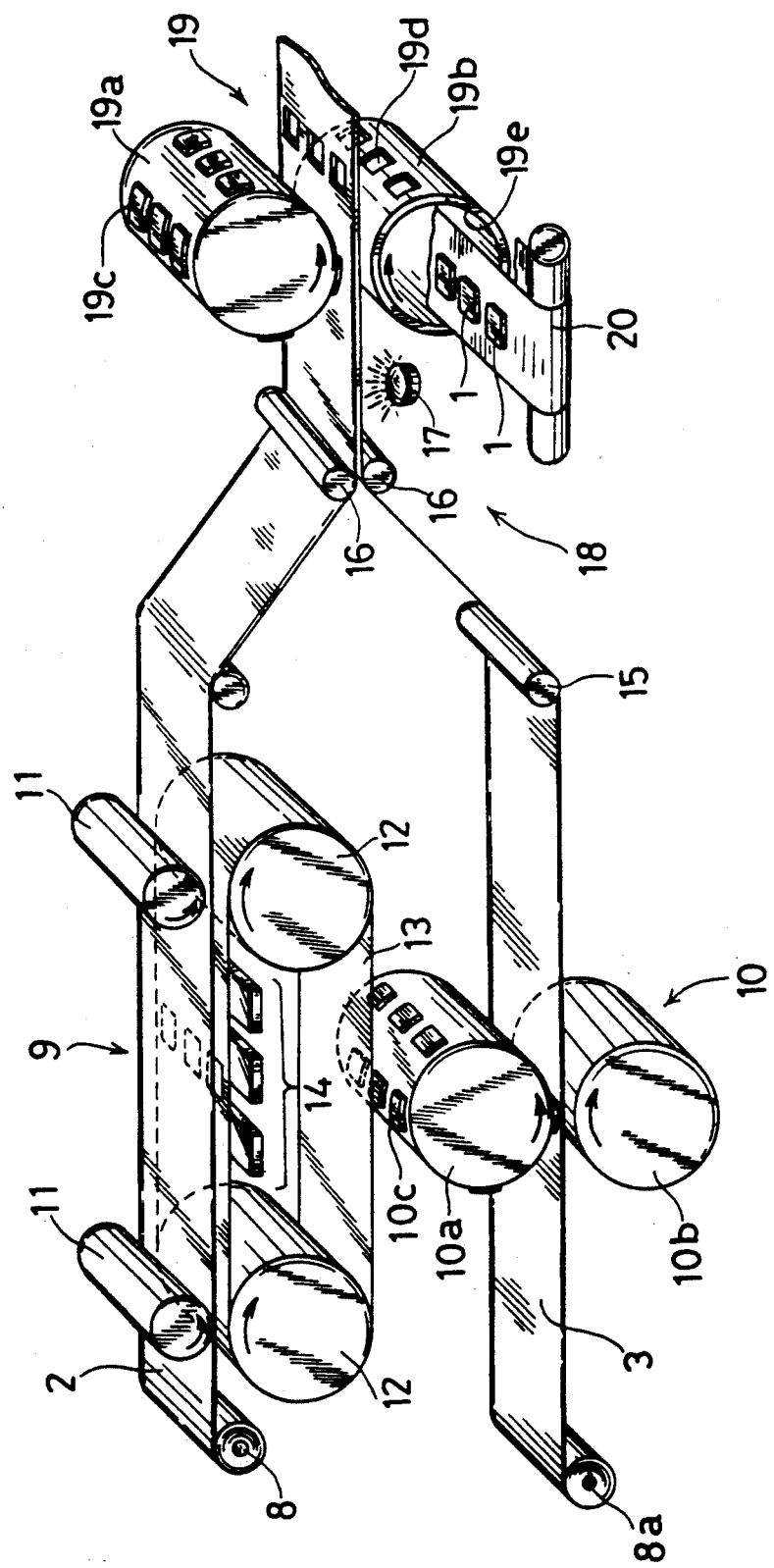
FIG. 2 is a diagram showing a schematic structure of an optical memory device manufacturing apparatus according to another embodiment of the present invention.

Another embodiment of the manufacturing apparatus according to the present invention will be described with reference to FIG. 2.

A guide truck forming station 10 comprises a pair of rollers 10a and 10b arranged opposed to each other with a sheet-like substrate 3 for forming guide trucks being interposed therebetween and both rotatably provided and is adapted to continuously form guide trucks by feeding the sheet-like substrate 3 fed from a sheet supplying station 8a while applying pressure thereto to transcribe patterns of irregular portions 10c fromed on the cylindrical surface of one of the rollers 10a to the sheet-like substrate 3.

The above described sheet-like substrate 2 through the recording portion forming station 9 and the sheet-like substrate 3 through the guide truck forming station 10 are adapted to be respectively led between sheet bonding rollers 16 after an adhesive having light hardenability and permeability is applied to this sheet-like substrate 3 by an adhesive applying roller 15 and to be bonded to each other by continuously laminating the sheet-like substrates 2 and 3 by the sheet bonding rollers 16 and hardening the adhesive by a light source 17 provided subsequently to the sheet bonding rollers 16. The adhesive applying roller 15, the sheet bonding rollers 16 and the light source 17 constitute a bonding processing station 18.

A cutting processing station 19 for cutting the above described bonded sheet-like substrates 2 and 3 in a constant shape is disposed on the downstream side of the bonding processing station 18. The other structure is the same as that in the embodiment shown in FIG. 1 and hence, the description thereof is not repeated. The sheet-like substrate 3 for forming guide tracks can be made of materials similar to those of the sheet-like substrate 2.

Figure 3:
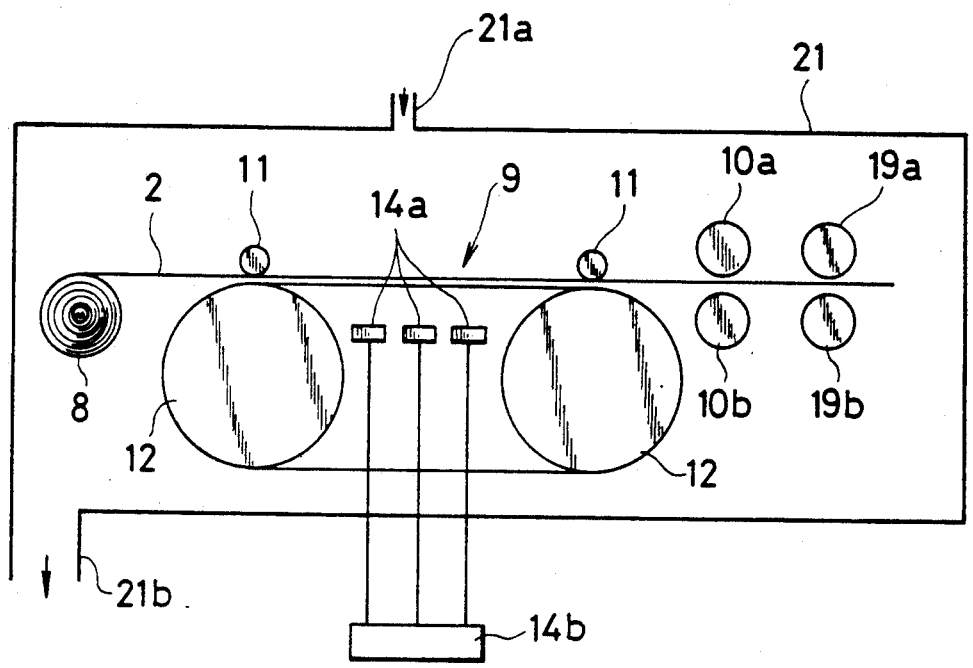
FIG. 3 is a diagram for explaining a structure of a manufacturing apparatus which is a modified example of the manufacturing apparatus shown in FIG. 1.

FIG. 3 is a diagram for explaining a structure of a manufacturing apparatus which is a modified example of the manufacturing apparatus shown in FIG. 1. In the apparatus shown in FIG. 3, the entire apparatus shown in FIG. 1 is accommodated in a chamber 21. Indicated at 21a is a gas supply port connected to a not-shown argon gas bomb, and at 21b is an exhaust port connected to a not-shown vacuum pump for exhausting the gas in the chamber 21. A high frequency voltage is applied to a target 14a for sputtering accommodated in the chamber 21 from the power supply 14b provided outside thereof. Such a structure facilitates provision of a gas atmosphere in the recording portion forming station 9, so that the optical memory devices are very smoothly manufactured continuously. The sheet-like substrate 2 and the formed recording portions are not contaminated with dust. Meanwhile, the manufacturing apparatus shown in FIG. 2 may be accommodated in the chamber as shown in FIG. 3, to obtain the same effect.

Figure 4:
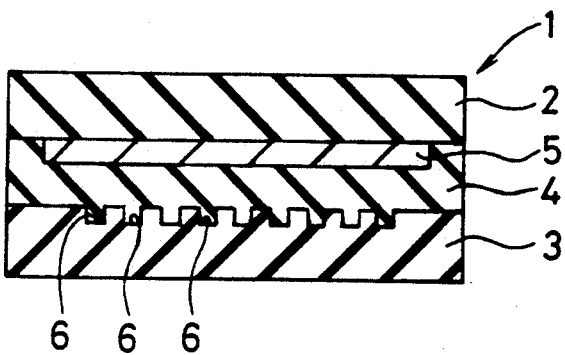
FIG. 4 is a cross-sectional view showing an optical memory device manufactured by the manufacturing apparatus shown in FIG. 2.

An example of the optical memory devices manufactured by the manufacturing apparatus shown in FIG. 2 will be described with reference to FIG. 4.

An optical memory device 1 comprises two substrates 2 and 3 approximately 0.2 to 1.0 mm thick. The substrates 2 and 3 are both formed of polycarbonate resins having light permeability. In addition, a recording portion 5 for optically recording information is formed on the side of the surface opposed to the substrate 3 out of the surfaces of the substrate 2, while guide trucks 6 for guiding a light beam are formed on the side of the surface opposed to the substrate 2 out of the surfaces of the substrate 3. The substrates 2 and 3 are laminated with an adhesive 4 made of resins having light hardenability and permeability (for example, UV-induced hardening resins). Meanwhile, a coating layer is not shown.

In the above described construction, the recording portion 5 and the guide tracks 6 are separately formed on the substrates 2 and 3, respectively, so that the recording portion 5 is formed flat according to a plane of the substrate 3 without being affected by irregularity of the guide tracks 6.

The manufacturing apparatus according to the present invention makes it possible to form the recording portions while continuously masking the sheet-like substrate continuously fed, so that the optical memory devices can be continuously manufactured. Accordingly, the effects of being able to reduce the cost of optical memory devices as well as being able to stably supply optical memory devices of constant quality can be obtained.

Furthermore, the conventional optical memory device constructed such that the recording layer is directly formed on the guide tracks has the disadvantage in that signal characteristics of the optical memory device largely depend on the shape and the precision of the guide tracks because the recording layer is stacked according to irregularity of the guide tracks. However, the optical memory device according to the present invention can avoid the disadvantage that signal characteristics of the optical memory device largely depend on the shape and the precision of the guide trucks because the recording portion is formed flat according to the plane of the substrate without being affected by irregularity of the guide tracks.

What is claimed is:

1. An apparatus for manufacturing an optical memory device of a certain size, comprising supplying means for continuously supplying a sheet-like substrate, endless belt-like masking means having a plurality of windows having a size corresponding to the certain size of the optical memory device, moving means for moving both the sheet-like substrate and the endless belt-like masking means in conforming directions and at conforming speeds, recording portion forming means for forming recording portions on the substrate through the endless belt-like masking means, guide track providing means for providing along the substrate guide tracks for guiding a light beam, and cutting means for cutting the substrate to a predetermined size, wherein said moving means comprises a pair of stretching rollers for stretching the endless belt-like masking means, a plurality of pressure rollers for pressing the sheet-like substrate against the masking means on the stretching rollers, and driving means for rotating the stretching rollers and the pressure rollers.

2. An apparatus for manufacturing an optical memory device of a certain size, comprising supplying means for continuously supplying a sheet-like substrate, endless belt-like masking means having a plurality of windows having a size corresponding to the certain size of the optical memory device, moving means for moving both the sheet-like substrate and the endless belt-like masking means in conforming directions and at conforming speeds, recording portion forming means for forming recording portions on the substrate through the endless belt-like masking means, guide track providing means for providing along the substrate guide tracks for guiding a light beam, and cutting means for cutting the substrate to a predetermined size, wherein said guide track providing means comprises supplying means for supplying a substrate for forming guide tracks, transcribing means for transcribing patterns of guide tracks to the substrate for forming guide tracks, and laminating means for continuously laminating the substrate for forming guide tracks having the guide tracks transcribed thereto to the sheet-like substrate having the recording portions formed thereon with an adhesive having light permeability.

* * * * *